(12) United States Patent
Becker et al.

(10) Patent No.: US 9,895,636 B2
(45) Date of Patent: *Feb. 20, 2018

(54) IN-LINE SINGLE OUTLET FILTER WITH AUTOMATIC CLOGGED FILTER ELEMENT BYPASS

(71) Applicant: AirSept, Inc., Atlanta, GA (US)

(72) Inventors: Aaron Becker, Atlanta, GA (US); Myron Stein, Laguna Niguel, CA (US)

(73) Assignee: AirSept, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,925

(22) Filed: Dec. 11, 2015

(65) Prior Publication Data

US 2016/0101378 A1    Apr. 14, 2016

Related U.S. Application Data

(63) Continuation of application No. 13/365,493, filed on Feb. 3, 2012, now Pat. No. 9,220,999.

(51) Int. Cl.
*B01D 35/06* (2006.01)
*B01D 29/33* (2006.01)
(Continued)

(52) U.S. Cl.
CPC ............ *B01D 35/06* (2013.01); *B01D 29/114* (2013.01); *B01D 29/33* (2013.01); *B01D 35/02* (2013.01);
(Continued)

(58) Field of Classification Search
CPC .......... B03C 1/28; B03C 1/286; B03C 1/288; B03C 1/30; B03C 2201/18;
(Continued)

(56) References Cited

U.S. PATENT DOCUMENTS 3,371,790 A    3/1968 Kudlaty et al.
3,727,761 A    4/1973 Aspinwall et al.
(Continued)

FOREIGN PATENT DOCUMENTS

AU          548 461 B2      12/1985
EP          0 071 877 A2     2/1983
WO     WO 2007/144680 A1    12/2007

OTHER PUBLICATIONS

Frequently Asked Questions, British Stainless Steel Association, Accessed Feb. 24, 2015, www.bssa.org.uk/faq.php?id=24.pp. 1-2.
(Continued)

*Primary Examiner* — David C Mellon
(74) *Attorney, Agent, or Firm* — Womble Bond Dickinson (US) LLP

(57) ABSTRACT

An in-line or in situ filter is disclosed for filtering fluid flowing through a hydraulic system, and particularly an automotive hydraulic system. The filter has a magnetic base with a central opening at its outlet end and a seat with a central opening at its inlet. The base and the seat are joined by a cylindrical filter element made of a magnetically susceptible mesh screen material. A spring within the filter element biases a ball against the central opening of the seat normally sealing off the opening and forcing fluid to flow through the filter element to be filtered before exiting through the central opening of the base. If the mesh screen becomes clogged, backpressure forces the ball away from the seat against the bias of the spring to allow fluid to bypass the filter element and flow directly through the filter. In the process, ferrous debris entrained within the fluid flow continues to be captured by attraction to the magnetic base and the magnetized filter element.

9 Claims, 4 Drawing Sheets

(51) Int. Cl.
  *B01D 35/02* (2006.01)
  *B01D 35/147* (2006.01)
  *B01D 29/11* (2006.01)

(52) U.S. Cl.
  CPC ...... *B01D 35/147* (2013.01); *B01D 2201/291* (2013.01); *B01D 2201/4069* (2013.01)

(58) Field of Classification Search
  CPC ............ B03C 2201/20; B03C 2201/30; B01D 2201/4069; B01D 29/114; B01D 29/33; B01D 35/02; B01D 35/06; B01D 35/147
  See application file for complete search history.

(56) References Cited

U.S. PATENT DOCUMENTS

| | | |
|---|---|---|
| 3,890,232 A | 6/1975 | Combest et al. |
| 6,613,220 B2 | 9/2003 | Golovatai-Schmidt |
| 7,890,165 B2 | 2/2011 | Wahlstrand et al. |
| 2003/0010697 A1 | 1/2003 | Sann et al. |
| 2006/0102533 A1 | 5/2006 | Faria |
| 2009/0242816 A1 | 10/2009 | Husband et al. |

OTHER PUBLICATIONS

International Search Report—& Written Opinion PCT/US2013/024327, dated May 17, 2013, AirSept, Inc.
International Preliminary Report on Patentability and Written Opinion for PCT/US2013/024327, dated Aug. 18, 2014, AirSept, Inc.

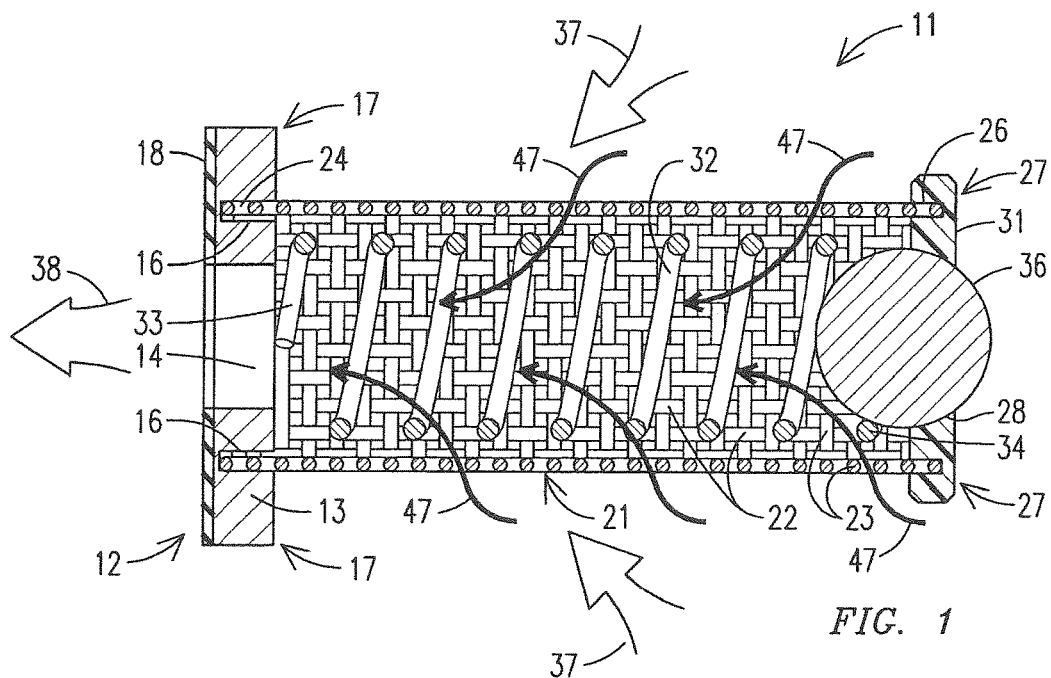
FIG. 1
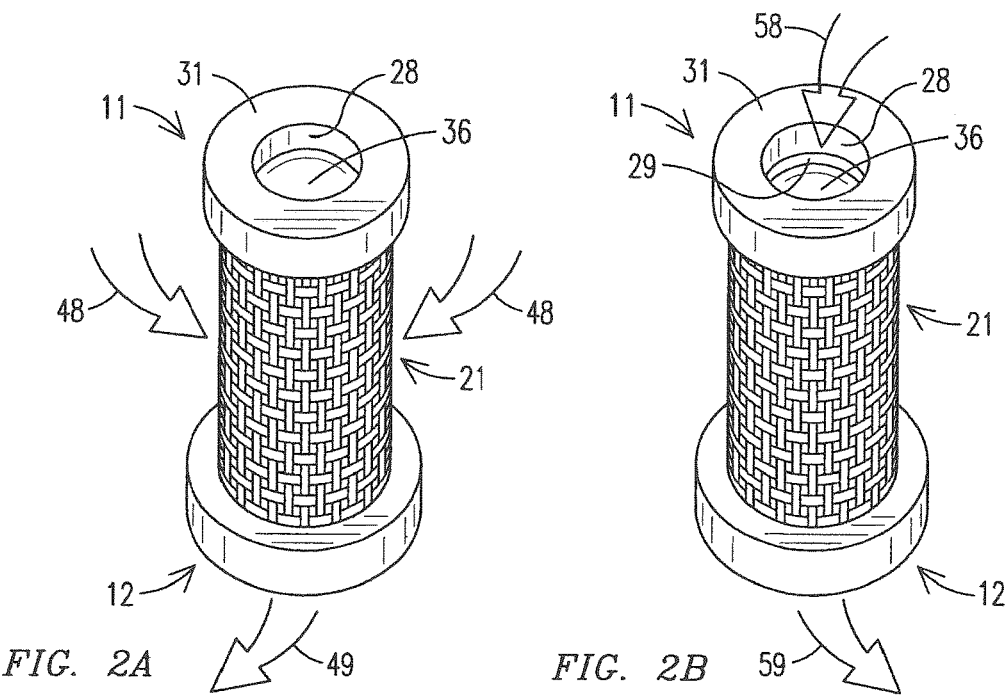
FIG. 2A
FIG. 2B

IN-LINE SINGLE OUTLET FILTER WITH AUTOMATIC CLOGGED FILTER ELEMENT BYPASS

REFERENCE TO RELATED APPLICATION

This application is a continuation of U.S. patent application Ser. No. 13/365,493 filed Feb. 3, 2012, which is incorporated by reference in it entirety, and for all purposes.

TECHNICAL FIELD

This disclosure relates generally to filters for filtering foreign debris from fluid flows, and more particularly to filters for filtering circulating automotive fluids such as hydraulic fluid, refrigerant, power steering fluid, and the like.

BACKGROUND

Filtering fluids as they circulate through automotive systems such as power steering systems, air conditioning systems, hydraulic systems, and the like can significantly increase the lifetimes of such systems and is therefore desirable. In this context, there is a need for a compact in-line or in situ filter that has a single outlet and a first or normal inlet path wherein fluid passes through a filter element before exiting the single outlet and a second or bypass path wherein fluid bypasses the filter element when it becomes clogged before exiting the single outlet. Further, the filter should be easily installable, easily replaceable, and should continue to capture certain types of debris even when operating in its bypass mode. It is to the provision of such a filter that the present invention is primarily directed.

SUMMARY

Briefly described, a fluid filter comprises a generally annular base having a central outlet opening and being formed at least partially of a magnetic material. An annular groove in the base receives one end of a cylindrical mesh screen filter element that is bonded to the base and extends therefrom to an inlet end. The filter element is made of a ferrous material as well such that the screen itself becomes magnetized by being in contact with the magnetic base. The inlet end of the filter element carries an at least partially pliable seat having a central opening that may be smaller than the central outlet opening of the base. A conical compression spring is disposed within the filter element with its large end resting on the base and its small end cradling a ball. The force of the compression spring normally biases and urges the ball against the central opening of the seat thereby closing off flow through this central opening. The ball is made of a non-magnetic material so that it is does not become magnetized. The filter is installable in-line or in situ within an inlet port or an outlet port of a component such as a fluid reservoir with its inlet end facing the direction of fluid flow.

The tension or spring constant of the conical spring is selected such that under normal conditions, the ball prevents fluid from flowing through the seat and forces it to flow around the filter, through the mesh openings of the filter element, and exit through the single outlet in a normal mode of operation. If, however, the filter element becomes clogged with debris, the force of the backpressure generated in the fluid by the clog is sufficient to overcome the force of the compression spring and force the ball out of engagement with the seat. This opens up the central opening of the seat, allowing fluid to flow through the seat before exiting from the single outlet of the filter in a bypass mode of the filter. In both modes, the fluid flows past the magnetized filter element and out through the single central outlet opening of the magnetic base so that ferrous debris that may be entrained in the flow continues to be captured by the filter element and the base.

These and other features, aspects, and advantages of the invention will be better understood by the skilled artisan upon review of the detailed description set forth below when taken in conjunction with the accompanying drawing figures, which are briefly described as follows.

BRIEF DESCRIPTION OF THE DRAWINGS

FIG. 1 is a cross sectional view of a filter that embodies principles of the invention in one preferred form.

FIGS. 2a and 2b are perspective views of the filter of FIG. 1 in its normal operating mode (FIG. 2a) and in its bypass operating mode (FIG. 2b).

DETAILED DESCRIPTION

Figure 3:
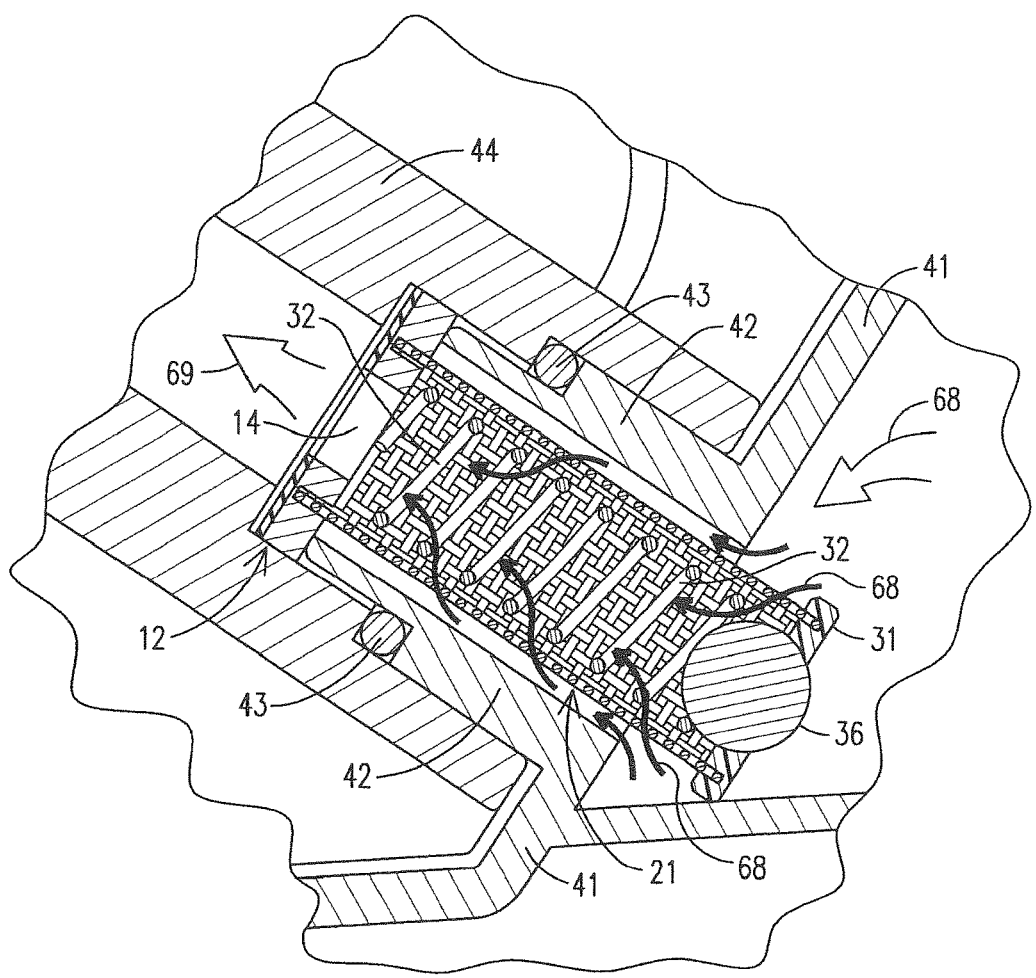
FIG. 3 is a cross sectional view of the filter of FIG. 1 shown installed in an outlet port of a component through which fluid circulates.

Referring now in more detail to the drawing figures, wherein like reference numerals indicate like parts throughout the several views, FIG. 1 illustrates in cross section a filter that embodies principles of the invention in one preferred form. The filter 11 comprises a base 12 made up of a generally annular magnet 13 having a central outlet opening 14. A rubberized gasket 18 may be attached to the magnet for certain applications. The magnet 13 is formed with an annular groove or slot 16 that surrounds the central outlet opening. A cylindrical filter element 21 is constructed of woven mesh screen material having circular elements 22 interwoven with longitudinal elements 23. The size of the openings or mesh size of the filter element can be selected to filter out of a fluid stream, any particles above a particular size that may cause damage to pumps or other components of a system. Furthermore, the material from which the elements are made is intentionally selected to be ferrous or otherwise magnetically susceptible.

The filter element has an outlet end 24 and an inlet end 26 opposite the outlet end. The outlet end of the filter element is disposed and bonded securely within the annular slot 16 of the base 12 and extends axially away from the base 13 to the inlet end of the filter element. Since the filter element is made of a ferrous material, the mesh screen of the filter element becomes magnetized by being in contact with the annular magnetic base. The outlet end may be bonded with appropriate adhesive, sealant, epoxy, or other mechanisms that insure that the end of the filter element will not separate from the base during use.

An annular seat 31 has a central opening 28 and is bonded to the inlet end of the filter element with its central opening coaxially aligned with the axis of the filter element. The annular seat may be formed of any appropriate material, but preferably is formed of a polymer material that is somewhat compliant, for purposes discussed below. The seat may or may not have a radially projecting rim 27 that extends outwardly from the filter element depending upon the particular application to which the filter is to be applied. A compression spring 32 is disposed inside the filter element 21 and has an outlet end portion 33 and an inlet end portion 34. The compression spring in the illustrated embodiment is conically shaped in that the diameter of the spring at its outlet end 33 is greater than the diameter of the spring at its inlet end 34.

A ball 36 is cradled in the inlet end of the conical spring and the spring constant is selected such that the ball 36 is yieldably biased by the spring 32 against the perimeter of the central opening 28 of the seat. As such, the ball 36 seals the central opening of the seat and defines a normal operating mode of the filter. The ball is made of a non-ferrous or otherwise non-magnetically susceptible material so that it does not become magnetized by being in proximity to the magnetic base or magnetized screen of the filter element. In the normal operating mode, fluid being circulated from the inlet end of the filter toward the outlet end of the filter flows around the seat 31, passes through the filter element 21, and flows out through the single central opening 14 of the base 12 as indicated by arrows 37, 47, and 38. In the process, the fluid is filtered in that the filter element captures particles larger than the mesh size of the filter's mesh screen that are entrained in the fluid. In addition, some ferrous particles entrained in the flow are captured by the magnetized screen through magnetic attraction even if the ferrous particles are smaller than the mesh size of the filter screen. Finally, as the filtered fluid flows through the central opening 14 of the base, the magnet 13 attracts remaining small particles of ferrous material that may have evaded capture by the filter element and still be entrained in the flow. What emerges from the central opening 14 is a filtered fluid with ferrous particles removed or greatly reduced. This filtering and cleaning occurs continuously as the fluid traverses a flow path in line with which the filter 11 is disposed.

After a period of operation, the filter element screen may become clogged with captured particles such that fluid flow through the filter element is choked off to an unacceptable extent. The fluid must nevertheless be allowed to circulate so that the system such as a power steering system supported by the fluid continues to operate. Accordingly, should the filter element become clogged, the resulting back pressure generated in the fluid upstream of the filter rises to an amount sufficient to overcome the force of the spring 32 holding the ball 36 against the seat 31. The ball 36 then moves away from the seat to open a path through the central opening 28 of the seat 31 allowing fluid to flow directly into the filter element without passing through the mesh screen material and exit directly out the central opening of the base 12. In this bypass operating mode of the filter, the now clogged filter element screen is bypassed and the fluid is not filtered by the screen. Nevertheless, damaging ferrous particles entrained in the fluid continue to be removed as the fluid flows past the still magnetized screen and through the central opening 14 of the magnetic base 12. In the process, ferrous particles in the flow are not attracted to the ball 36 since it is made of a non-ferrous material and does not become magnetized. This eliminates contamination of the ball by ferrous particles sticking to its surface. Of course, a clogged condition of the filter should be avoided through regular maintenance and replacement of the filter; but, in the event maintenance is neglected, the bypass mode of the filter element ensures that fluid will continue to circulate and automotive systems supported by this flow will continue to operate.

FIG. 2a is a perspective view of the filter 11 in its normal operating mode wherein the filter element screen is not clogged. The ball 36, which preferably is made of stainless steel, nickel coated metal, PTFE, or some other non-magnetic, non-corrosive, smooth surfaced material, is seen biased against the periphery of the central opening 28 of the seat 31 thereby sealing off the central opening. Under these conditions, fluid is forced to flow around the seat, through the mesh screen material of the filter element, and exit out the single central opening of the base 12, as indicated by arrows 48 and 49 in FIG. 2a. FIG. 2b illustrates the configuration of the filter 11 in its bypass mode wherein the mesh screen of the filter element 21 has become clogged with captured debris from the fluid. In this mode, the backpressure generated by the clogged filter element as a result either of pressure or suction depending upon which side of a pump the filter is located, has overcome the bias of the spring within the filter element, forcing the ball 36 away from the central opening 28 of the seat 31 opening up a gap 28 therebetween. Fluid is now free to enter the filter 11 through the open central opening 28 of the seat, flow around the non-magnetized ball 29, through the interior of the magnetized filter element 21, and exit the filter through the central opening of the magnetic base 12 as indicated by arrows 58 and 59. To allow the fluid to flow freely around the ball, the ball is somewhat smaller in diameter than the internal diameter of the filter element and, as mentioned, is made of a non-magnetically susceptible material and is thus not magnetized and does not attract ferrous debris. The tapered nature of the conical spring 32 cradles and supports the smaller ball at is inlet end while forming a larger diameter base to rest securely on the base 12 against the inside of the screen element at its outlet end.

The spring constant of the conical spring 32 and thus the force applied by the spring to the ball may be selected to be appropriate for a particular intended application in which the filter 11 is to be used. For example, in lower pressure systems such as a power steering system, the spring constant may be lower so that the bypass mode is initiated by a lower back pressure upstream of a clogged filter. Conversely, in a higher pressure system such as in hydraulic drive systems, the spring constant may be higher so that higher back pressure is required to initiate the bypass mode of the filter.

Figure 4:
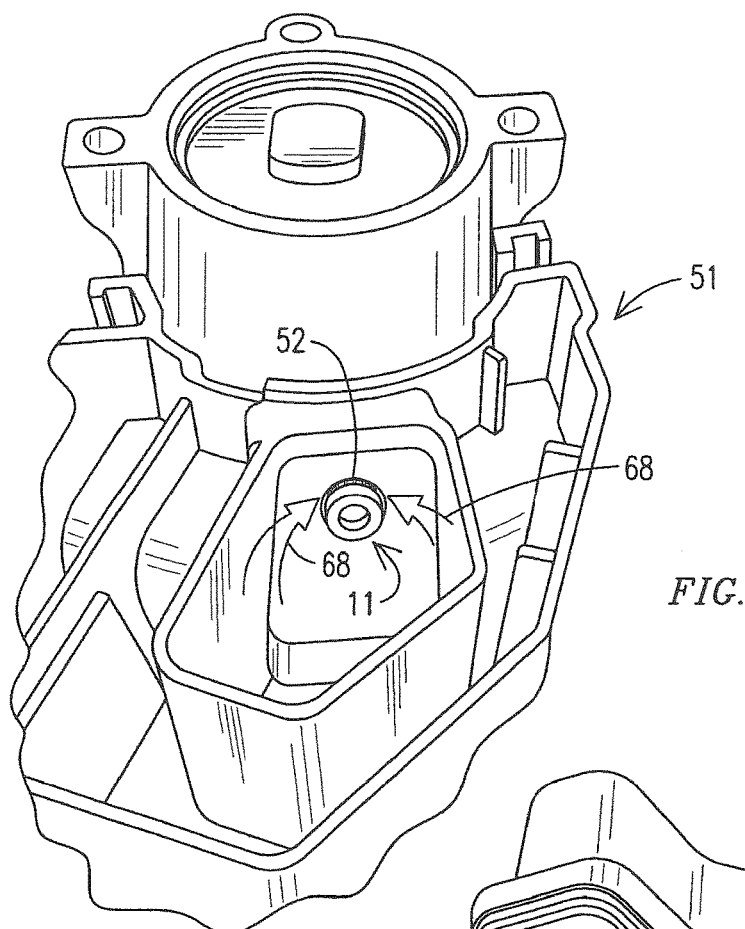
FIG. 4 is a perspective partially cut away view showing the inlet end of the filter of FIG. 1 within a component through which fluid circulates.

FIG. 3 shows the filter 11 in one exemplary application where the filter 11 is installed within an outlet port 42 of an automotive component casing 41 through which fluid circulates. In this application, the filter is inserted into the outlet port and a hose coupler 44 is attached to the outlet port to receive fluid flowing out of the outlet port. The filter is shown in its normal operating mode, meaning that the filter element screen is not clogged and is passing fluid normally. The fluid thus enters the filter through the filter element 21, is filtered thereby, and exits through the central opening 14 of the base from where it flows through a hose or directly into another component in a next successive circulation. While not shown in FIG. 3, it will be understood from the discussion above that should the filter element screen become clogged, backpressure within the component 41 forces the ball to the left thereby initiating the bypass mode of the filter 11. FIG. 4 shows the inlet end of the filter 11 inside an automotive component 51; the component having been opened up to reveal its interior portions. Fluid flows around the filter 11, through the mesh screen of the filter element, and out the outlet of the component as indicated by arrows 68 and as described above.

Figure 5:
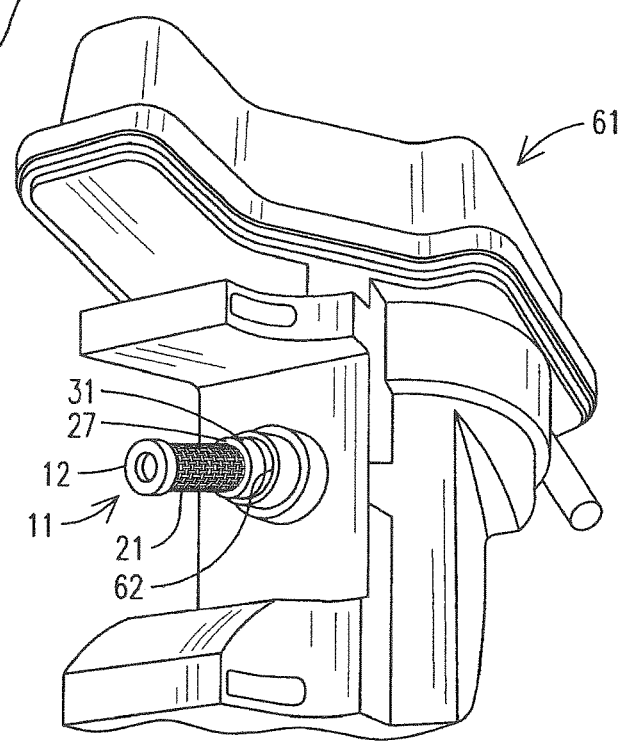
FIG. 5 is a perspective view illustrating initial installation of a filter shown in FIG. 1 into an outlet port of a component prior to attaching a coupler to the port.
Figure 6:
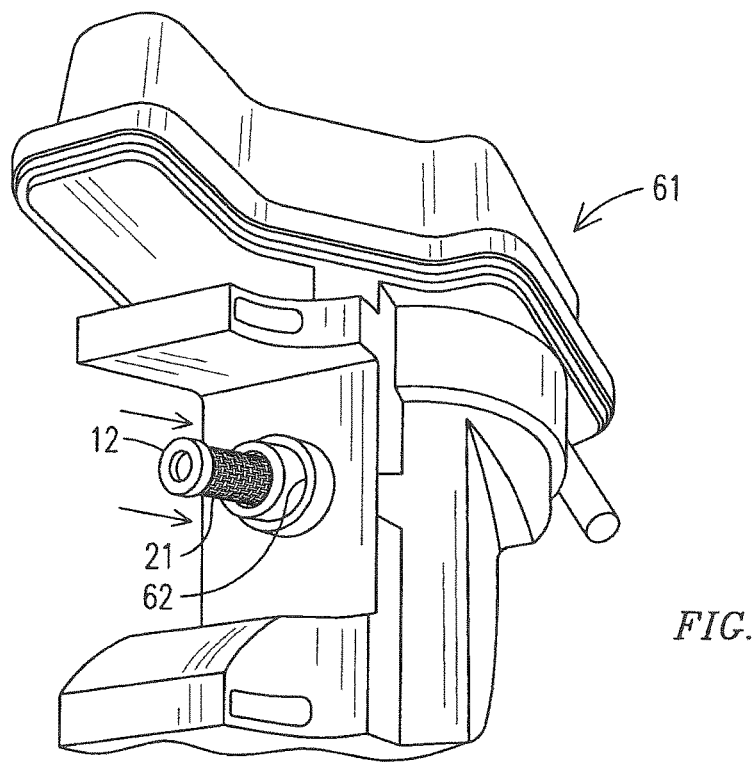
FIG. 6 is a perspective view illustrating continued installation of a filter shown in FIG. 1 into an outlet port of a component prior to attaching a coupler to the port.
Figure 7:
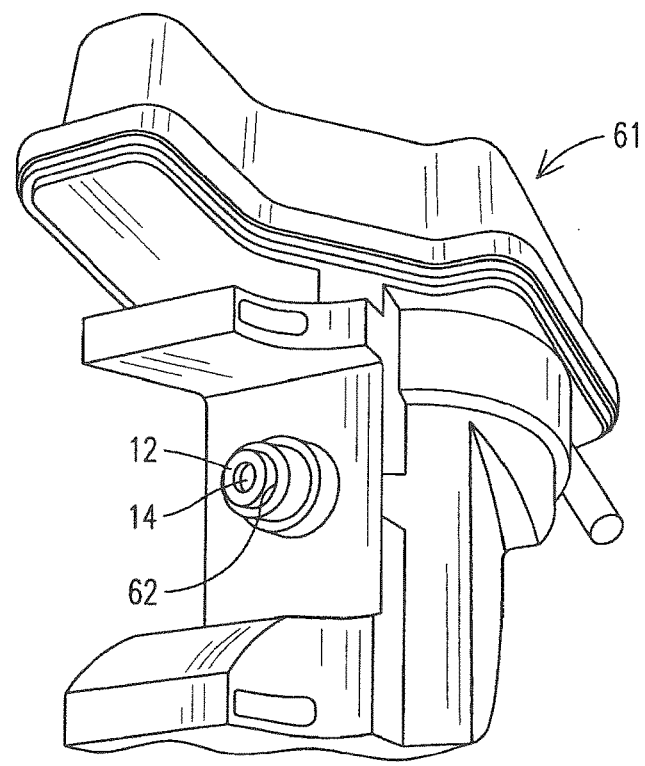
FIG. 7 is a perspective view illustrating final installation of a filter shown in FIG. 1 into an outlet port of a component prior to attaching a coupler to the port.

Finally, FIGS. 5, 6, and 7 illustrate progressively the ease with which the filter of this invention is installed in an outlet port 62 of an automotive component 61. In FIG. 5, the filter 11 is being inserted into the outlet port 62 with its inlet end 31 first. In this particular application, the seat defines a radially projecting rim 27. In FIG. 6, the filter 11 is urged into the outlet port in the direction indicated by the arrows and in FIG. 7 the filter is shown completely inserted into the outlet port with the flange portion of the base 12 resting against the rim of the outlet port. A coupler may then be attached to the outlet port to receive filtered fluid from the component 61 as described above. The coupler may be part of another component that receives the fluid; or, it may be a hose coupler that receives the fluid and conveys it to a remote location within the fluid circuit. The fluid may be forced to flow by pressure generated by a pump upstream of the component containing the filter or by suction generated by a pump downstream of the component containing the filter.

The invention has been described herein in terms of preferred embodiments and methodologies considered by the inventor to represent the best mode of carrying out the invention. It will be understood by the skilled artisan; however, that a wide range of additions, deletions, and modifications, both subtle and gross, may be made to the illustrated and exemplary embodiments without departing from the spirit and scope of the invention set forth in the claims.

What is claimed is:

1. A fluid filter comprising:
   a magnetic base having an outlet end with an outlet opening;
   an elongated filter element having an outer wall and comprising filter material surrounding and defining a passageway, the filter element having an inlet end and an outlet end opposite the inlet end;
   the outlet end of the filter element being attached to and engaging the magnetic base with the outlet opening of the magnetic base being in fluid communication with the passageway of the filter element;
   a seat attached to the inlet end of the filter element, the seat having an inlet opening in fluid communication with the passageway of the filter element;
   a spring disposed within the passageway of the filter element, the spring having a first end portion adjacent the seat and a second end portion adjacent the magnetic base;
   a valve member located within the passageway of the filter element between the first end portion of the spring and the seat, the valve member being shaped and sized to close communication through the inlet opening in the seat when urged into contact with the seat;
   the spring having a spring constant adequate to hold the valve member in yieldable contact with the seat to seal the inlet opening of the seat and to yield to allow the valve member to be displaced away from the seat to open up communication through the inlet opening in response to a predetermined pressure exerted on the valve member;
   the filter element being made of a magnetically susceptible material;
   the valve member and the seat being constructed of a material that is not magnetically susceptible; and
   the filter element being magnetized through engagement with the magnetic base so that the filter element and the magnetic base each can capture metal particles within a fluid moving through the filter element and through the outlet opening of the magnetic base;
   the valve member and the seat not being magnetized through engagement with the filter element so that the valve member and the seat do not capture metal particles within a fluid moving through the filter element or through the inlet opening of the seat;
   the fluid filter being sized and configured to be disposed within a fluid conduit with the outer wall of the filter element being spaced from walls of the fluid conduit to filter fluid flowing through the fluid conduit;
   such that when the filter element is not clogged, the pressure of the fluid is less than the predetermined pressure and fluid flows around the seat, between the outer wall of the filter element and the walls of the conduit, through the filter material into the passageway of the filter element, and out the outlet opening in the magnetic base; and
   when the filter element is clogged, the pressure of the fluid is greater than the predetermined pressure and thereby displaces the valve member from the seat so that fluid flows through the inlet opening of the seat, around the valve member, into the passageway of the filter element, and out the outlet opening in the magnetic base such that the non-magnetized seat and the non-magnetized valve member do not capture metal particles within the fluid but the magnetic base continues to capture magnetic particles within the fluid even though the filter element is clogged.

2. A fluid filter as claimed in claim 1 wherein the outlet opening in the base is a central opening through the base.

3. A fluid filter as claimed in claim 1 wherein the magnetic base is substantially disk-shaped.

4. A fluid filter as claimed in claim 3 wherein the outlet opening extends through a central portion of the disk-shaped magnetic base.

5. A fluid filter as claimed in claim 1 wherein the magnetic base comprises a magnet.

6. A fluid filter as claimed in claim 1 wherein the filter material is formed of a ferrous material.

7. A fluid filter as claimed in claim 6 wherein the filter material is magnetically susceptible.

8. A fluid filter as claimed in claim 1 wherein the filter element is substantially cylindrical in shape.

9. A fluid filter as claimed in claim 1 wherein the outlet end of the filter element is embedded in the magnetic base.

* * * * *